(12) United States Patent
Ryan

(10) Patent No.: US 12,434,280 B2
(45) Date of Patent: Oct. 7, 2025

(54) METHOD AND APPARATUS FOR THE TREATMENT OF WASTE MATERIAL

(71) Applicant: POWERHOUSE ENERGY GROUP PLC, Bridgend (GB)

(72) Inventor: David Ryan, Bridgend (GB)

(73) Assignee: POWERHOUSE ENERGY GROUP PLC, Bridgend (GB)

( * ) Notice: Subject to any disclaimer, the term of this patent is extended or adjusted under 35 U.S.C. 154(b) by 677 days.

(21) Appl. No.: 17/627,986

(22) PCT Filed: Jul. 20, 2020

(86) PCT No.: PCT/GB2020/051732
§ 371 (c)(1),
(2) Date: Jan. 18, 2022

(87) PCT Pub. No.: WO2021/009520
PCT Pub. Date: Jan. 21, 2021

(65) Prior Publication Data
US 2022/0258218 A1    Aug. 18, 2022

(30) Foreign Application Priority Data

Jul. 18, 2019  (GB) ...................................... 1910309

(51) Int. Cl.
*B09B 3/45* (2022.01)
*F23G 5/027* (2006.01)
(Continued)

(52) U.S. Cl.
CPC ................ *B09B 3/45* (2022.01); *F23G 5/027* (2013.01); *F23G 5/033* (2013.01); *F23G 5/46* (2013.01);
(Continued)

(58) Field of Classification Search
None
See application file for complete search history.

(56) References Cited

U.S. PATENT DOCUMENTS 3,049,168 A * 8/1962 Litwinoff .................. F23C 1/02
236/14
3,593,923 A * 7/1971 Soliterman ............. F23D 14/00
431/177
(Continued)

FOREIGN PATENT DOCUMENTS

BE   1008556 A3   6/1996
CA   2576355 A1   7/2008
(Continued)

OTHER PUBLICATIONS

English abstract of JP4616923B1.
(Continued)

*Primary Examiner* — David J Laux
(74) *Attorney, Agent, or Firm* — Caesar Rivise, PC

(57) ABSTRACT

A method and an apparatus for treating comminuted waste material the method comprising: •a) providing a heating chamber (28) and one or more combustion heating means (40*a-f*) for heating the contents of the heating chamber (28), the heating chamber (28) having an inlet (21) and an outlet (22), •b) feeding comminuted waste material through the inlet (21) and into the heating chamber (28); •c) heating the comminuted waste material in the heating chamber (28), using the combustion heating means (40*a-f*), to generate a combustible gas; and •d) supplying at least a portion of the generated combustible gas to the one or more combustion heating means (40*a-f*) for heating the heating chamber (28).

17 Claims, 10 Drawing Sheets

(51) Int. Cl.
*F23G 5/033* (2006.01)
*F23G 5/46* (2006.01)
*F23G 5/50* (2006.01)
*F23L 7/00* (2006.01)

(52) U.S. Cl.
CPC ............... *F23G 5/50* (2013.01); *F23L 7/005* (2013.01); *F23G 2900/00001* (2013.01)

(56) References Cited

U.S. PATENT DOCUMENTS

| | | | |
|---|---|---|---|
| 4,046,085 | A | 9/1977 | Barry et al. |
| 4,215,637 | A | 8/1980 | Lombana |
| 4,750,437 | A | 6/1988 | Rouse |
| 5,390,630 | A | 2/1995 | Virr |
| 6,213,030 | B1 * | 4/2001 | Robertson ............. F23J 15/025 110/259 |
| 6,221,329 | B1 | 4/2001 | Faulkner et al. |
| 6,269,286 | B1 | 7/2001 | Tse et al. |
| 6,332,909 | B1 | 12/2001 | Teshima et al. |
| 6,367,395 | B1 | 4/2002 | Masek |
| 6,837,910 | B1 | 1/2005 | Yoshikawa et al. |
| 9,505,999 | B1 | 11/2016 | Peng |
| 9,885,478 | B1 | 2/2018 | May et al. |
| 2003/0019736 | A1 * | 1/2003 | Garman ................... F23G 7/02 203/23 |
| 2003/0037714 | A1 | 2/2003 | Tetsomoto et al. |
| 2004/0197239 | A1 | 10/2004 | Mirkovic et al. |
| 2005/0031516 | A1 | 2/2005 | Marty et al. |
| 2006/0112639 | A1 | 6/2006 | Nick et al. |
| 2006/0228294 | A1 | 10/2006 | Davis et al. |
| 2007/0289509 | A1 | 12/2007 | Vera |
| 2009/0241420 | A1 | 10/2009 | Rokhvarger et al. |
| 2009/0314622 | A1 | 12/2009 | Joo |
| 2010/0139534 | A1 | 6/2010 | Tsantrizos |
| 2010/0156104 | A1 * | 6/2010 | Bottinelli ................. C10J 3/20 422/600 |
| 2010/0163396 | A1 | 7/2010 | Michalek et al. |
| 2010/0269411 | A1 * | 10/2010 | Goetsch ................. C10J 3/721 48/204 |
| 2010/0315851 | A1 | 12/2010 | Schober et al. |
| 2011/0104575 | A1 | 5/2011 | Mui et al. |
| 2011/0201699 | A1 | 8/2011 | Lucas et al. |
| 2011/0266500 | A1 | 11/2011 | Schubert |
| 2012/0204971 | A1 * | 8/2012 | Wu ........................... F02C 3/22 137/334 |
| 2013/0240343 | A1 | 9/2013 | Wolfe |
| 2013/0327257 | A1 | 12/2013 | Kawai et al. |
| 2014/0004471 | A1 * | 1/2014 | Vandergriendt .......... C10J 3/20 431/278 |
| 2014/0166465 | A1 * | 6/2014 | Varma ....................... F27B 7/34 201/37 |
| 2014/0227142 | A1 | 8/2014 | Chung et al. |
| 2014/0332724 | A1 | 11/2014 | Tsangaris et al. |
| 2015/0291897 | A1 | 10/2015 | Blevins et al. |
| 2016/0194232 | A1 | 7/2016 | Ravikumar et al. |
| 2016/0194262 | A1 * | 7/2016 | Ravikumar ......... C07C 29/1518 705/35 |
| 2017/0275542 | A1 * | 9/2017 | Rehmat ................... C10J 3/005 |
| 2019/0119588 | A1 | 4/2019 | O'Grady |
| 2021/0308644 | A1 | 10/2021 | Carriera |
| 2023/0312385 | A1 | 10/2023 | Nilsen et al. |

FOREIGN PATENT DOCUMENTS

| | | |
|---|---|---|
| CA | 2944577 A1 | 10/2015 |
| CN | H11304129 A | 11/1999 |
| CN | 201396766 Y | 2/2010 |
| CN | 208108124 U | 11/2018 |
| EP | 1108955 A1 | 6/2001 |
| EP | 2737928 A1 | 6/2014 |
| EP | 3193084 A1 | 7/2017 |
| GB | 2477422 A | 8/2011 |
| GB | 2499404 A | 8/2013 |
| JP | 2003113381 A | 4/2003 |
| JP | 2004163070 A | 6/2004 |
| JP | 2006083310 A | 3/2006 |
| JP | 2007092003 A | 4/2007 |
| JP | 4616923 B1 | 1/2011 |
| JP | 2011094818 A | 5/2011 |
| JP | 2015512972 A | 4/2015 |
| JP | 2017517468 A | 6/2017 |
| JP | 2005351562 A | 12/2022 |
| JP | 2001200093 A | 1/2024 |
| JP | 2003302026 A | 10/2024 |
| KR | 20060017963 A | 2/2006 |
| WO | WO03/095072 A1 | 11/2003 |
| WO | WO2005/093323 A1 | 10/2005 |

OTHER PUBLICATIONS

English abstact of JP2004163070A.
English abstract of CN201396766Y.
English abstract of BE1008556A3.
English abstract of CN208108124U.
English abstract of JPH11304129A.
Abstract Luo et al., "Syngas Production by Catalytic Steam Gasification of Municipal Solid Waste in Fixed-Bed Reactor", Energy, vol. 44, No. 1, pp. 391-395 (2012).
International Search Report for related PCT Application No. PCT/GB2020/051730 dated Jan. 12, 2021.
International Search Report for related PCT Application No. PCT/GB2020/051731 dated Nov. 3, 2020.
International Search Report for related PCT Application No. PCT/GB2020/051732 dated Nov. 3, 2020.
Search Report for related Great Britain Patent Application No. GB1910309.2 dated Jan. 28, 2020.
Search Report for related Great Britain Patent Application No. GB1910311.8 dated Jan. 28, 2020.
Search Report for related Great Britain Patent Application No. GB1910313.4 dated Jan. 28, 2020.
English abstract of JP2011094818A.
Examination Report for corresponding Great Britain Patent Application No. GB1910309.2 dated Apr. 3, 2023.
English abstract of JP2001200093A.
English abstract of JP2007092003A.
English abstract of JP2005351562A.
English abstract of JP2003302026A.
English abstract of JP2015512972A.

* cited by examiner

METHOD AND APPARATUS FOR THE TREATMENT OF WASTE MATERIAL

CROSS REFERENCE TO RELATED APPLICATIONS

This United States national phase application claims the benefit under 35 U.S.C. § 371 of PCT Application No. PCT/GB2020/051732, filed on Jul. 20, 2020, which in turn claims priority to British Application Serial No. GB 1910309.2, filed on Jul. 18, 2019, and all of whose entire disclosures are incorporated by reference herein.

BACKGROUND OF THE INVENTION

This invention relates generally to a method of treating waste material and to an apparatus for treating waste material. More specifically, although not exclusively, the invention relates to a method of treating comminuted waste material and to an apparatus for treating comminuted waste material.

It is known to heat biomass materials to generate synthesis gas. Synthesis gas is a gaseous mixture comprising hydrogen, carbon monoxide and methane, amongst other substances. The treatment process typically entails heating granulated or otherwise comminuted biomass waste material within a kiln. The kiln is generally heated by a heating system. It is also known to add steam to the contents of the kiln, for example to provide a reducing atmosphere within which synthesis gas may be more readily generated and/or the ratio of constituents of the synthesis gas may be controlled. The steam is typically pre-generated by heating water using a further heating system, prior to introduction of the steam into the kiln. The generated synthesis gas can then be sent on for further treatment.

As will be appreciated by one skilled in the art, the apparatus for generating synthesis gas (and for its further processing) is relatively complex. Furthermore, the treatment process is typically run continuously, for example 24 hours a day. Accordingly, the heating system, compression systems and the like require a relatively large quantity of energy. These relatively high energy requirements may result in relatively high operating costs for such apparatus. However, in order for hydrogen (for example) generated from biomass waste material to be economically competitive with hydrogen generated from other sources, the treatment method must necessarily be as inexpensive as possible. Accordingly, it would be advantageous to minimise the running costs of such apparatus for treating waste material.

It would also be beneficial to increase the efficiency of the method, for example relative to prior art methods. It would be beneficial to provide a relative increase in efficiency of the kiln heating method, of the steam production method, of the gasification process and/or of the production of a component of a generated gas (e.g. hydrogen).

In recent years the proliferation of plastic products and packaging has generated (and continues to generate) large volumes of waste material. Plastics waste material has traditionally been delivered to landfill, for natural decomposition. However, such plastics waste material may take a long time to naturally decompose, for example in the order of many hundreds of years. Accordingly, it has been proposed to treat waste plastics material instead of delivering it to landfill, such that by-products of the treated waste may find use. It would be convenient to separate and recycle plastics materials so that they can be re-processed to produce useful products.

Unfortunately, recycling and recycling technologies are not universal with regards to plastics wastes materials. Further, it is relatively expensive and challenging to process contaminated waste plastics materials, or mixed plastics waste streams. Indeed, there are some plastics materials which currently impossible (or prohibitively expensive) to recycle.

Unfortunately, where a waste stream is contaminated it tends to prove too expensive to separate out the recyclable plastics materials from those which are not recyclable and so the entire waste stream may not be processed.

Plastics packaging is a major source of plastics materials which are difficult to recycle, typically because of the functional properties of the plastics, e.g. plastics barrier films used in food packaging. Tyres are another difficult-to-process waste material.

In the circumstance where the waste stream cannot be recycled, the waste stream will typically be diverted to landfill.

BRIEF SUMMARY OF THE INVENTION

It is an object of the current invention to provide ways in which useful work can be extracted from plastics waste materials for example mixed and or contaminated waste plastics materials and vehicle tyres.

Accordingly, a first aspect of the invention provides a method of treating comminuted waste material, the method comprising:
 a) providing a heating chamber and one or more combustion heating means or combustion heater for heating the contents of the heating chamber, the heating chamber having an inlet and an outlet,
 b) feeding comminuted waste material through the inlet and into the heating chamber;
 c) heating the comminuted waste material in the heating chamber, using the combustion heating means or combustion heater, to generate a combustible gas; and
 d) supplying at least a portion of the generated combustible gas to the one or more combustion heating means or combustion heater for heating the heating chamber.

Advantageously, the invention provides a relatively more efficient method of treating comminuted waste material compared to prior art methods. For example, supplying at least a portion of the generated combustible gas to the one or more combustion heating means or combustion heater allows for a relatively reduced quantity of external fuel to be supplied to the one or more combustion heating means or combustion heater. In this way, heating of the heating chamber may be effected at relatively reduced expense compared with prior art methods.

The comminuted waste material may comprise plastics waste, for example polyethylene terephthalate, high-density polyethylene, low-density polyethylene, linear low-density polyethylene, polyvinylchloride, polypropylene, or the like. The comminuted waste material may comprise rubber, biomass, tyre crumbs or the like. The comminuted waste material may comprise any suitable combination of plastics and or of other materials.

The term 'comminuted' as used herein should be taken to mean a substance which has been reduced to small particles or fragments.

The combustible gas may comprise a combustible hydrocarbon, for example methane or another suitable alkane. The combustible gas may form a component of a gaseous mixture, e.g. a generated gaseous mixture. The gaseous mixture may comprise synthesis gas. The synthesis gas may comprise hydrogen, methane, carbon monoxide. The synthesis gas may comprise one or more further substances.

In embodiments, the method may comprise a step e) of supplying at least a portion of the generated combustible gas to a generator, for example for generating electrical energy. The generator may supply electrical energy to control or operate one or more component or machine associated with the steps of the method. Additionally or alternatively, the generator may supply electrical energy to the or a electricity grid. Additionally or alternatively, the generator may supply electrical energy to one or more further component or machine.

In embodiments, at least a portion of the generated combustible gas may be sent or supplied to a gas grid. In embodiments, at least a portion of the generated combustible gas may be processed into one or more further chemicals.

In embodiments, step c) may comprise heating the comminuted waste material in a first zone of the heating chamber to a first temperature T1, for example to gasify the comminuted waste material.

The first temperature T1 may be sufficiently high to at least partially gasify the comminuted waste material. The first temperature T1 may be sufficiently high to fully gasify the comminuted waste material.

In embodiments, step c) may comprise heating the gasified material in a second zone of the heating chamber to a second temperature T2, for example to generate the combustible gas. The second temperature T2 may be greater than the first temperature T1.

In embodiments, step c) may comprise heating the combustible gas in a third zone of the heating chamber, e.g. to a third temperature T3. The third temperature T3 may be greater than the first temperature T1. The third temperature T3 may be less than the second temperature T2. The third temperature T3 may be greater than the second temperature T2. The third temperature T3 may be equal (e.g. substantially) to the second temperature T2.

One or more of the zones within the heating chamber may be the same size, e.g. have the same length, width and/or radius. One or more of the zones within the heating chamber may be a different size, e.g. have a different length, width and/or radius.

Where three zones are present within the heating chamber the first and second zone may be the same size, e.g. have the same length, width and/or radius. The third zone may be larger or smaller than than the first and second zones, e.g. the third zone may have a larger or smaller length, width and/or radius than the first and second zones. Preferably, the third zone is smaller than the first and second zones, e.g the third zone has a smaller length, width and/or radius than the first and second zones.

Where three zones are present within the heating chamber the first and second zones may be a different size, e.g. have a different length, width and/or radius. The third zone may be the same size, e.g. have the same length, width and/or radius, as the second zone. The third zone may be a different size, e.g. have a different length, width and/or radius, to the second zone. In an embodiment, the third zone is smaller than the second zone, e.g the third zone has a smaller length, width and/or radius than the second zone. In an embodiment the zones have the same width but are of the same or different lengths. Clearly, if the zones have a different length, for a given flow rate along the heating chamber, the residence time in each zone will be different. Where the temperatures are different in the different zones the material will be exposed to different temperatures and/or other conditions (e.g. atmosphere) for different time periods when the zones are of a different length (for a given throughput of material).

The temperature of the heating chamber may be above 250° C. throughout. For example, the temperature of the heating chamber may be above 250° C., e.g. above 275° C., 300° C., 325° C., 350° C., 375° C., 400° C., 425° C., 450° C., 475° C., 500° C., 525° C., 550° C., 575° C., 600° C., 625° C. or 650° C., in each of the zones, e.g. in each of the three zones.

The first, second and/or third temperature T1, T2, T3 may comprise predetermined temperatures. The first temperature T1 may be set to between about 650 and 750° C., say about 700° C. The second temperature T2 may be set to between about 800 and 1000° C., say between about 850 and 950° C., for example about 900° C. The third temperature T3 may be set to between about 1000 and 1200° C., say between about 1050 and 1150° C., for example about 1100° C.

The temperature in one or more zones, e.g. the first, second and/or third zone, may be controlled or controllable by controlling, e.g. individually controlling, the supply of fuel and/or air to the respective combustion heating means or combustion heaters. Controlling the supply of fuel and/or air may involve increasing or reducing, the mass flow rate of air and/or fuel supplied to one or more combustion heating means or combustion heater at the or each zone, e.g. the first, second and/or third zone.

Fuel may comprise a mixture of two fuel components (e.g. natural gas and synthesis gas). Controlling the mass flow rate of fuel may comprise altering the ratio of the two fuel components. Controlling the temperature in the or each zone may comprise controlling the ratio of two fuel components supplied to the one or more combustion heating means or combustion heaters. Controlling the temperature in the of each zone may comprise controlling the ratio of fuel to air supplied to the combustion heating means or combustion heaters.

In embodiments, the method may comprise measuring or determining the temperature inside the heating chamber. The method may comprise using one or more temperature sensors to measure or determine the temperature in the heating chamber. The method may comprise using one or more temperature sensors which are inside the heating chamber to measure or determine the temperature in the heating chamber. The method may comprise using one or more temperature sensors which are outside the heating chamber to measure or determine the temperature in the heating chamber. The method may comprise using an array of temperature sensors, e.g. inside and/or outside of the heating chamber (for example to measure or determine the temperature in the heating chamber). Where plural zones are defined in the heating chamber, the method may comprise measuring or determining the temperature of one, some or each zone in the heating zone (for example of the first zone, second zone and/or third zone, where provided).

In some embodiments, the method may comprise adjusting the heat generated by the, one, some or each of the one or more combustion heating means or combustion heater, for example in response to a measured or determined temperature inside the heating chamber.

In some embodiments, the method may comprise a step f) of cleaning the generated combustible gas. Step f) may occur prior to step d), e.g. and may be subsequent to step c).

In embodiments, the heating chamber may be rotatable, in use. For example, the heating chamber may be rotatable about a rotational axis. The method may comprise a step g) of rotating the heating chamber.

In some embodiments, the method may comprise a step h) of introducing, e.g. injecting, steam into the heating chamber. The steam may be introduced at a temperature of between about 400 and 800° C., for example between about 500 and 700° C., say between about 550 and 650° C., e.g. approximately 600° C.

The steam may be produced by a heat exchanger (e.g. a boiler). The steam may be superheated. The heat exchanger may be heated by excess heat from heating the heating chamber (e.g. heated by flue gas). Water may be provided to the heat exchanger. The temperature of the water may be controlled or controllable. The temperature of the water may be dependent on the amount of comminuted waste material fed into the heating chamber.

The volume of water may be controllable. The water may be provided as a continuous flow or it may be an intermitant flow e.g. pulsed.

Benefically, introducing, e.g. injecting, steam into the heating chamber may rapidly increase the temperature of the comminuted waste material.

Steam may be introduced at any point within the heating chamber. For example, steam may be introduced, e.g. injected, at the inlet and/or in any of the zones of the heating chamber, e.g. in the first, second and/or third zone. Steam may be introduced upstream or downstream of the comminuted waste material. Preferably, steam is introduced downstream of the comminuted waste material. Preferably, steam is injected in the first zone of the heating chamber.

The introduction, e.g. injection, of steam may be offset from the rotational axis of the heating chamber.

In some embodiments, the method may comprise further processing the generated combustible gas. This further processing may occur prior to step d). The further processing may comprise removing or separating out one or more components of the generated combustible gas, for example removing or separating out hydrogen from the generated combustible gas.

A further aspect of the invention provides an apparatus for treating comminuted waste material, the apparatus comprising: a heating chamber for generating a combustible gas from comminuted waste material, the heating chamber comprising an inlet for the introduction of comminuted waste material into the heating chamber, and an outlet for the egress of a generated combustible gas from the heating chamber; one or more combustion heating means or combustion heater configured or configurable to heat, in use, the contents of the heating chamber; and a supply system configured or configurable to supply to the one or more combustion heating means or combustion heater at least a portion of a combustible gas generated, in use, in the heating chamber.

In embodiments, the apparatus may comprise a generator, e.g. for generating electrical energy. In embodiments, the supply system may be configured or configurable to supply to the generator at least a portion of a combustible gas generated, in use, in the heating chamber.

In some embodiments, the one or more combustion heating means or combustion heater may be configured or configurable to heat a first zone in the heating chamber to a first temperature $T1$. The one or more combustion heating means or combustion heater may be configured or configurable to heat a second zone in the heating chamber to second temperature $T2$. The second temperature $T2$ may be greater than the first temperature $T1$.

In embodiments the one or more combustion heating means or combustion heater may be configured or configurable to heat a third zone in the heating chamber to a third temperature $T3$. The third temperature $T3$ may be greater than the first temperature $T1$.

The one or more combustion heating means or combustion heater may comprise one or more combustion heaters, for example one or more heaters using a fuel source such as gas. The one or more combustion heating means or combustion heater may comprise one or more gas heaters, e.g. one or more gas burners. In embodiments, the one or more combustion heating means or combustion heater may be located, in use, outside of the heating chamber. The one or more combustion heating means or combustion heater may be arranged to heat the heating chamber.

In embodiments, the one or more combustion heating means or combustion heater comprises plural combustion heating means or combustion heater. A first combustion heating means or combustion heater may be configured or configurable to heat comminuted waste material in a or the first zone of the heating chamber, e.g. to the or a first temperature $T1$ (where plural zones are defined in the heating chamber). A second combustion heating means or combustion heater may be configured or configurable to heat gasified material in a or the second zone of the heating chamber, e.g. to the second temperature $T2$. A third combustion heating means or combustion heater may be configured or configurable to heat a third zone of the heating chamber, e.g. to a third temperature $T3$. In embodiments, the first zone may be at or adjacent the inlet. The third zone may be at or adjacent the outlet. the second zone may be in between the first and third zones.

The combustion heating means or combustion heater may be configured or configurable to heat gasified material in the second and/or subsequent zones. Synthesis gas may be produced in the second and subsequent zones, e.g. the second and third zones.

In embodiments, the apparatus may comprise one or more temperature sensors, for example configured or configurable to measure or determine the temperature inside the heating chamber. The one or more temperature sensors may be arranged or configured to measure or determine the temperature one, some or each of the zones of the heating chamber (where plural zones are defined therein). In embodiments, one or more temperature sensors may be arranged to measure or determine the temperature of the first zone. One or more temperature sensors may be arranged to measure or determine the temperature of the second zone. One or more temperature sensors may be arranged to measure or determine the temperature of the third zone. Where plural temperature sensors are provided they may comprise an array (e.g. plural arrays). One or more of the temperature sensors (or arrays of temperature sensors) may be located inside of the heating chamber. One or more of the temperature sensors (or arrays of temperature sensors) may be located outside of the heating chamber.

In embodiments, the apparatus may comprise a controller, e.g. configured or configurable to control the heating system. The controller may be configured or configurable to adjust or alter the heat generated by one or more of the one or more combustion heating means or combustion heater, for example in response to a temperature measured or determined inside the heating chamber (for example by the one or more temperature sensors). In embodiments, the controller may be configured or configurable to shut down the apparatus, for example if the temperature in the heating chamber exceeds a predetermined threshold (e.g. is higher or lower than a predetermined threshold temperature). In embodiments, the controller may be configured or configurable to alert an operator, for example if the temperature in the heating chamber exceeds a predetermined threshold. The alert may comprise an alarm which may be visual and/or audible.

The gas burners may be present at set locations along the heating chamber. For example, one or more gas burners may be located in each of the zones of the heating chamber. The controller may be configured to control the heat applied by the or each gas burner. The heat applied by each of the gas burners may be independently controlled by the control system, irrespective of the number of burners. For example, the control system may increase or reduce the mass flow rate of air supplied to one, some or each of the gas burners. The control system may also increase or reduce the mass flow rate of fuel to one, some or each of the gas burners. The fuel may comprise a mixture of two fuel components (e.g. natural gas and synthesis gas). Additionally or alternatively, the control system may alter the ratio of the mixture of the two fuel components.

Gas control valves may be present to alter the amount of the first fuel component supplied to the respective gas burners, or prevent any of the first fuel component from being supplied to the respective gas burner. Each gas control valve may alter the amount of the second fuel component supplied to the respective gas burner, or prevent any of the second fuel component from being supplied to the respective gas burner.

In embodiments, the apparatus may comprise a cleaning system, for example for cleaning combustible gas generated in the heating chamber.

In some embodiments, the apparatus may comprise a kiln, for example a rotary kiln. The rotary kiln may be of the direct or indirect type. The heating chamber may be provided or defined within the or a kiln. The heating chamber (e.g. the kiln or a portion thereof) may be arranged or configured to be rotatable, in use. The heating chamber may comprise a thermal conversion chamber.

In some embodiments, the apparatus may comprise a steam delivery means or steam delivery system, for example which may be configured or configurable to introduce, e.g. inject, steam into the heating chamber. The steam delivery means or system may comprise a source of water. The steam delivery means or system may comprise a boiler, for example arranged or arrangeable to boil water (e.g. from the source of water). The boiler may be a heat exchanger. The steam may be superheated. The heat exchanger may be heated by excess heat from heating the heating chamber (e.g. heated by flue gas).

The temperature of the water for producing steam may be controlled with a controller, control means or control system.

The volume of the water for producing steam may be controlled with a controller, control means or control system.

An adjustment means may be provided to control the location of steam introduced within the heating chamber.

For the avoidance of doubt, any of the features described herein apply equally to any aspect of the invention. For example, the apparatus may comprise any one or more features of the method relevant to the apparatus and/or the method may comprise any one or more features or steps relevant to one or more features of the apparatus.

A further aspect of the invention provides a computer program element comprising computer readable program code means or a computer readable program system for causing a processor to execute a procedure to implement one or more steps of the aforementioned method.

A yet further aspect of the invention provides the computer program element embodied on a computer readable medium.

A yet further aspect of the invention provides a computer readable medium having a program stored thereon, where the program is arranged to make a computer execute a procedure to implement one or more steps of the aforementioned method.

A yet further aspect of the invention provides a control means or control system or controller comprising the aforementioned computer program element or computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed.

BRIEF DESCRIPTION OF SEVERAL VIEWS OF THE DRAWINGS

Embodiments of the invention will now be described by way of example only with reference to the accompanying drawings in which.

DETAILED DESCRIPTION OF THE PREFERRED EMBODIMENTS

Figure 1:
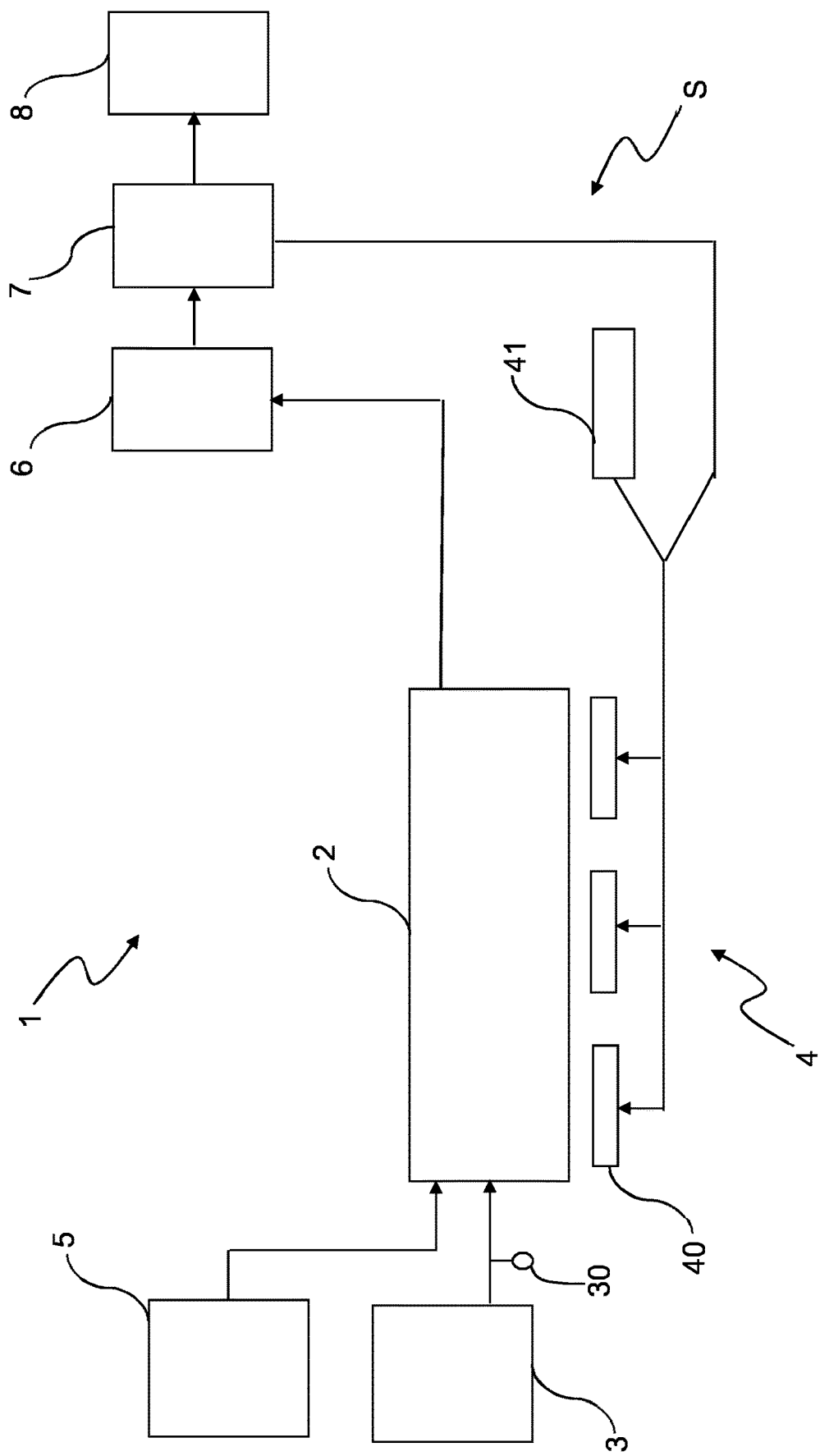
FIG. 1 shows a generalised schematic view of an apparatus for treating comminuted waste material according to an embodiment of the invention.
Figure 2:
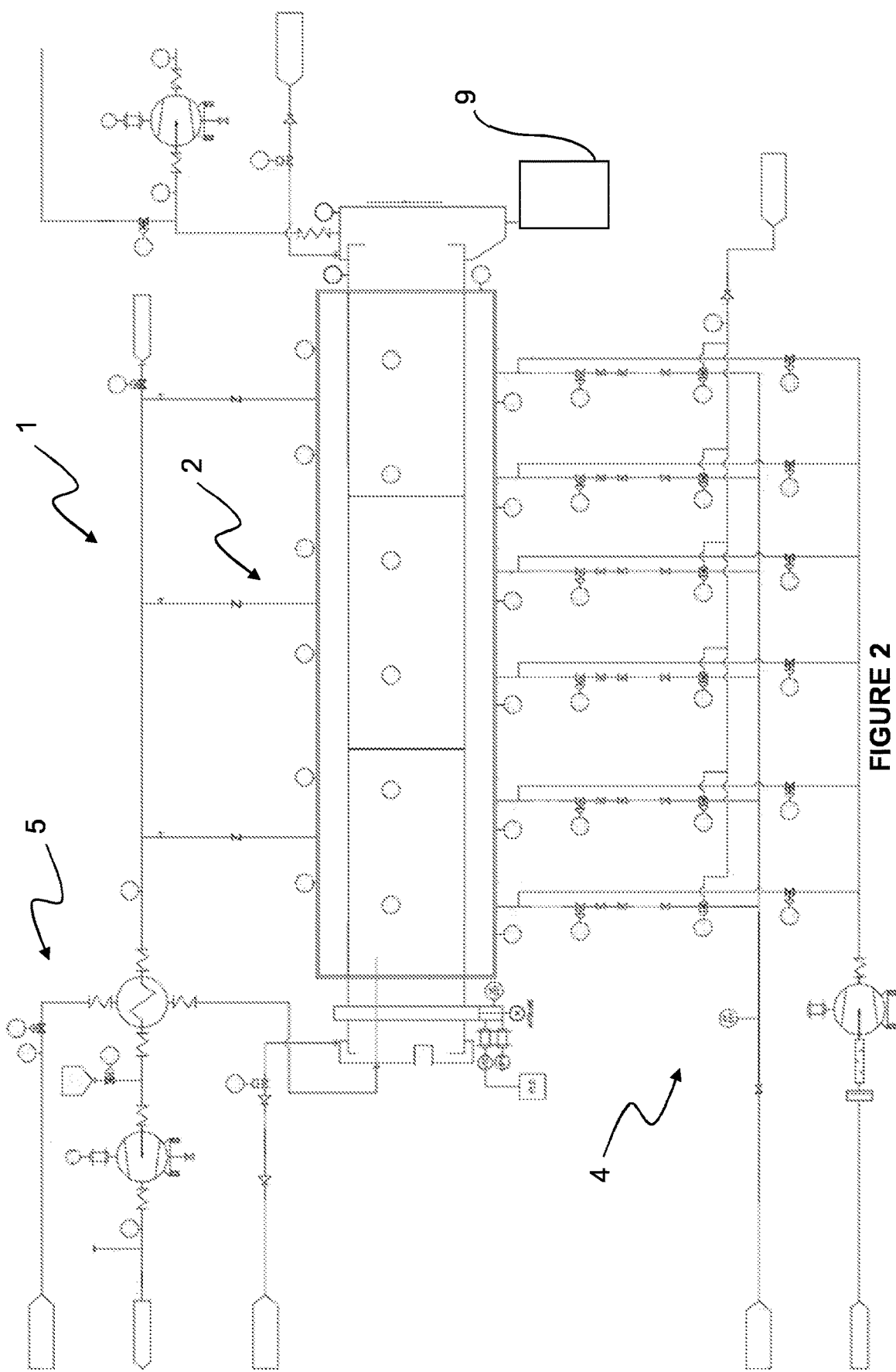
FIG. 2 shows a detailed schematic view of the indirect rotary kiln, heating system and steam system shown in FIG. 1.

Referring now to FIG. 1, there is shown a schematic representation of an apparatus 1 for treating comminuted waste material according to an embodiment of the invention.

In use, the apparatus 1 converts waste material feedstock, for example granulated plastics, into synthesis gas (as will be described in greater detail below).

Figure 3:
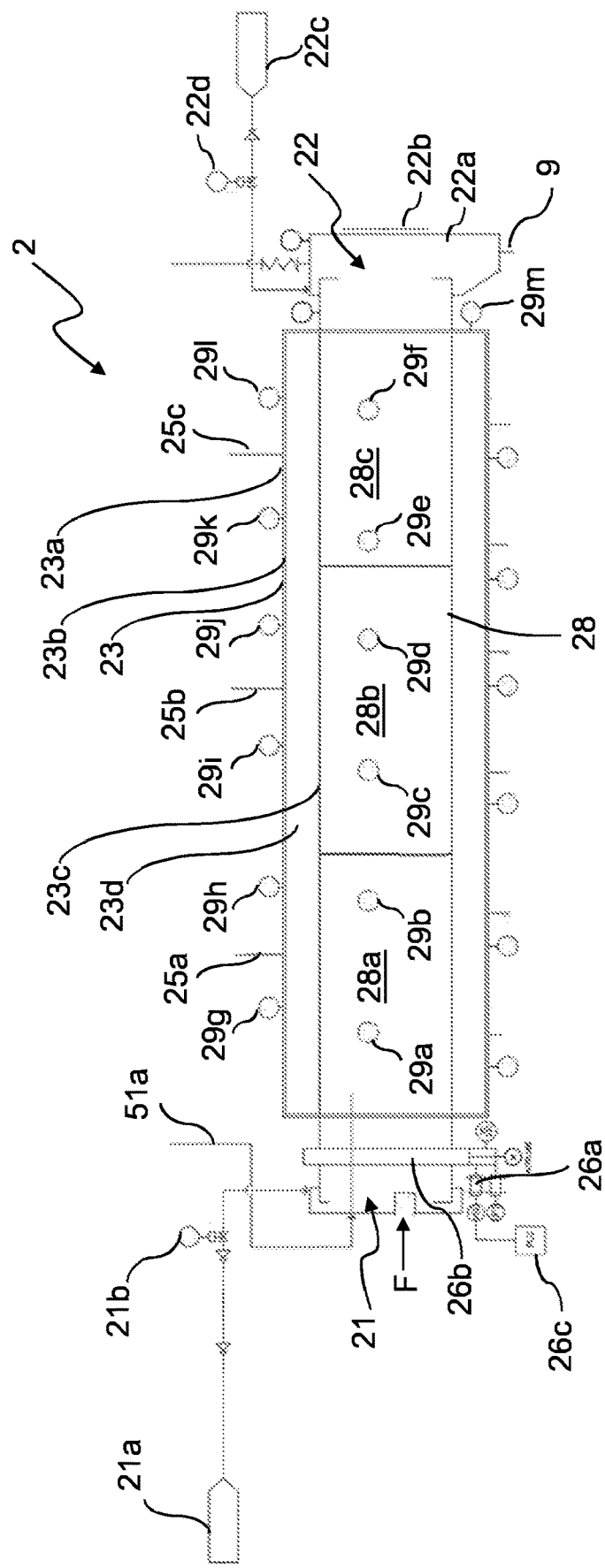
FIG. 3 shows an enlarged view of the indirect rotary kiln shown in FIG. 2.

As shown in FIG. 3, the apparatus 1 comprises a heating chamber 28, which is provided within an indirect rotary kiln 2 in this embodiment. The apparatus 1 further comprises a waste feed system 3, a heating system 4, a steam system 5, a cleaning system 6, a storage system 7 and a further processing system 8. The heating system 4 comprises plural combustion heaters 40. The plural combustion heaters 40 are arranged to heat, in use, the contents of the indirect rotary kiln 2. The waste feed system 3 is arranged to introduce, in use, comminuted waste material into the indirect rotary kiln 2. The steam system 5 is arranged to introduce, in use, steam into the indirect rotary kiln 2. The indirect rotary kiln 2 is fluidly connected to the heating system 4 by a supply system S. The supply system S comprises the cleaning system 6 and the storage system 7 in this embodiment. In embodiments, however, the supply system S may be absent one or each of the cleaning system 6 and the storage system 7.

The cleaning system 6 is arranged to receive, in use, generated synthetic gas from the indirect rotary kiln 2. The storage system 7 is arranged to receive, in use, cleaned synthetic gas from the cleaning system 6. The storage system 7 is arranged to send at least a portion of cleaned synthetic gas to the further processing system 8.

Referring now to FIGS. 2 to 6, there is shown a detailed schematic view of portions of the apparatus for treating comminuted waste material shown in FIG. 1.

As shown in FIG. 3, the indirect rotary kiln 2 comprises an inlet 21 and an outlet 22. The inlet 21 and outlet 22 are disposed at opposite ends of the indirect rotary kiln 2, in this embodiment. The indirect rotary kiln 2 comprises a drum 23. The drum 23 comprises an outer shell 23a. The outer shell 23a surrounds a layer of insulating refractory bricks 23b. The insulating refractory bricks 23b surround a rotatable tube 23c. The rotatable tube 23c extends beyond the ends of the outer shell 23a on either end. A heating space 23d is defined between the insulating refractory bricks 23b and the rotatable tube 23c. In use, the outer shell 23a and insulating refractory bricks 23b are stationary whilst the rotatable tube 23c is rotated. The rotatable tube 23c may have a diameter of about 1.5 m. The rotatable tube 23c may have a heated length of about 10 m.

The indirect rotary kiln 2 is installed, for use, at an angle relative to the horizontal of approximately 1.5°. The indirect rotary kiln 2 is arranged such that the inlet 21 is relatively higher than is the outlet 22. A variable speed drive motor 26a is provided, which in this embodiment is located adjacent the inlet 21 of the indirect rotary kiln 2. A mechanical drive chain 26b is also provided. The mechanical drive chain 26b links the variable speed drive motor 26a to the rotatable tube 23c. In use, activation of the variable speed drive motor 26a causes the mechanical drive chain 26b to move and, hence causes the rotatable tube 23c to rotate. The rotary kiln 2 is supported on water cooled bearings (not shown). The rotatable tube 23c is sealed using nitrogen purge sprung seals (not shown).

A discharge hood 22a is provided adjacent the outlet 22 of the indirect rotatable kiln 2. The discharge hood 22a is in fluid communication with the outlet 22. An inspection hatch 22b is provided on the discharge hood 22a.

A heating chamber 28 is defined within the rotatable tube 23c. The heating chamber 28 is divided into a first zone 28a, a second zone 28b and a third zone 28c. The first zone 28a is adjacent the inlet 21. the third zone 28c is adjacent the outlet 22. The second zone 28b is provided between the first and second zones 28a, 28c. In this embodiment, each of the zones 28a, 28b, 28c are of approximately equal length and/or volume. In embodiments, however, this need not be the case and one or more of the zones 28a, 28b, 28c may be of different lengths and/or volumes.

The apparatus 1 comprises an array 29 of temperature sensors, in this embodiment. The array 29 comprises temperature sensors 29a, 29b, 29c, 29d, 29e, 29f located inside of the rotatable tube 23c, in this embodiment. Two of the temperature sensors 29a, 29b, 29c, 29d, 29e, 29f located inside of the rotatable tube 23c are located inside each of the zones 28a, 28b, 28c, in this embodiment. The array 29 also comprises temperature sensors 29g, 29h, 29i, 29j, 29k, 29l located in the heating space 23d.

The apparatus comprises a pressure sensor 29m. The pressure sensor 29m is configured or arranged to monitor the pressure in the heating space 23d.

The heating space 23d contains three exhaust vents 25a, 25b, 25c are provided through the outer shell 23a. The exhaust vents 25a, 25b, 25c are in fluid communication with the heating space 23d. One of the exhaust vents 25a, 25b, 25c is located adjacent each of the zones 28a, 28b, 28c of the heating chamber 28, respectively.

The apparatus 1 further comprises a first nitrogen supply 21a. The first nitrogen supply 21a is in fluid communication with the inlet 21 of the indirect rotary kiln 2. The apparatus 1 further comprises a second nitrogen supply 22c. The second nitrogen supply 22c is in fluid communication with the discharge hood 22a. A check valve 21b is provided between the first nitrogen supply 21a and the rotatable tube 23c. A check valve 22d is provided between the second nitrogen supply 22c and the discharge hood 22a.

The feed system 3 comprises a feed screw (not shown) in this embodiment. However, in embodiments the feed system 3 may comprise any suitable means for feeding waste material into the indirect rotary kiln 2, as will be appreciated by one skilled in the art. As shown in FIG. 1, a flow sensor 30 is arranged to monitor the amount (e.g. the mass flow rate) of comminuted waste material into the heating chamber 28.

Figure 4:
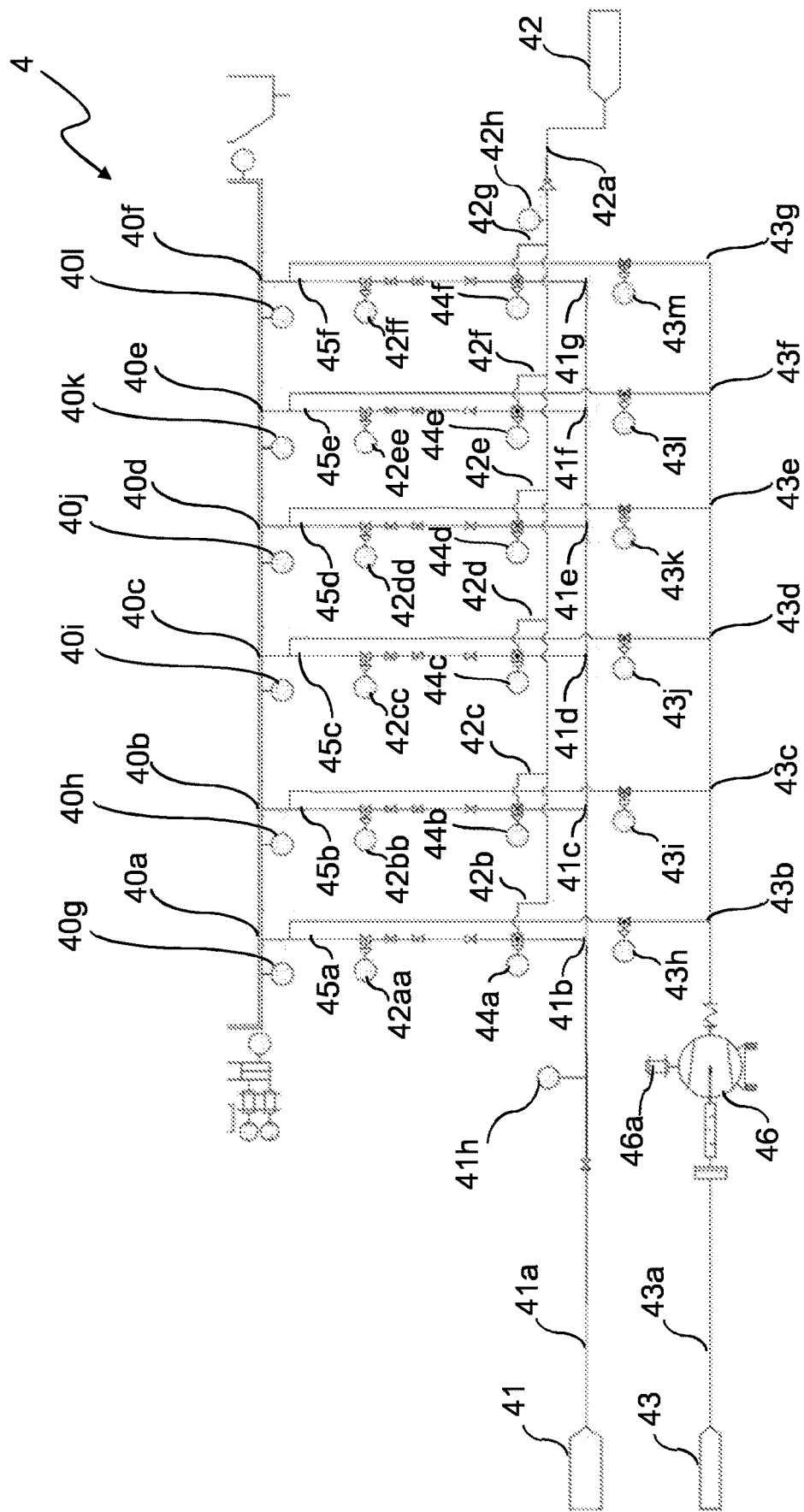
FIG. 4 shows an enlarged view of the heating system shown in FIG. 2.

Referring now to FIG. 4, the heating system 4 comprises plural combustion heaters 40 which are gas burners 40a, 40b, 40c, 40d, 40e, 40f, in this embodiment. The gas burners 40a, 40b, 40c, 40d, 40e, 40f are arranged, in use, to heat the heating space 23d. The gas burners 40a, 40b, 40c, 40d, 40e, 40f are lean burn high efficiency gas burners. The gas burners 40a, 40b, 40c, 40d, 40e, 40f are configured to be individually controllable (as will be described in greater detail later). In this embodiment, two of the gas burners 40a, 40b, 40c, 40d, 40e, 40f are located adjacent each of the zones 28a, 28b, 28c. The gas burners 40a, 40b, 40c, 40d, 40e, 40f are equally spaced along the length of the indirect rotary kiln 2. Each gas burner 40a, 40b, 40c, 40d, 40e, 40f is provided with a respective monitoring device 40g, 40h, 40i, 40j, 40k, 40l. The monitoring devices 40g, 40h, 40i, 40j, 40k, 40l are flame detectors, in this embodiment.

The heating system 4 comprises a natural gas supply 41. The natural gas supply 41 is in fluid communication with gas control valves 44a, 44b, 44c, 44d, 44e, 44f via a natural gas pipeline 41a. The natural gas pipeline 41a has parallel branches 41b, 41c, 41d, 41e, 41f, 41g. On each branch 41b, 41c, 41d, 41e, 41f, 41g there is located a gas control valve 44a, 44b, 44c, 44d, 44e, 44f, respectively. A flow sensor 41h is also provided. The flow sensor 41h is arranged to monitor flow through the natural gas pipeline 41a, e.g. flow between the natural gas supply 41 and the first branch 41b.

The heating system 4 also comprises a synthesis gas supply pipeline 42a in fluid communication with a store of generated synthesis gas 42 (as will be described in greater detail later). The synthesis gas supply pipeline 42a is in fluid communication with the gas control valves 44a, 44b, 44c, 44d, 44e, 44f. The synthesis gas pipeline 42a has parallel branches 42b, 42c, 42d, 42e, 42f, 42g. A pressure sensor 42h is also provided. The pressure sensor 42h is configured to measure or determine the pressure of gas in the synthesis gas pipeline 42a, e.g. between the distal branch 42g and the store 42 of synthesis gas.

The natural gas pipeline 41a is fluidly connected to each gas burner 40a, 40b, 40c, 40d, 40e, 40f by, respectively, a gas pipe 45a, 45b, 45c, 45d, 45e, 45f. The synthesis gas supply pipeline 42a is fluidly connected to each gas burner 40a, 40b, 40c, 40d, 40e, 40f by, respectively, a gas pipe 45a, 45b, 45c, 45d, 45e, 45f. Each gas pipe 45a, 45b, 45c, 45d, 45e, 45f comprises a gas control valve 44a, 44b, 44c, 44d, 44e, 44f. Each gas pipe 45a, 45b, 45c, 45d, 45e, 45f comprises a temperature control valve 42aa, 42bb, 42cc, 42dd, 42ee, 42ff.

Each gas control valve 44a, 44b, 44c, 44d, 44e, 44f is located between the respective branch 41b, 41c, 41d, 41e, 41f, 41g of the natural gas pipeline 41a and the respective gas pipe 45a, 45b, 45c, 45d, 45e, 45f. Each gas control valve 44a, 44b, 44c, 44d, 44e, 44f is located between the respective branch 42b, 42c, 42d, 42e, 42f, 42g of the synthesis gas pipeline 42a and the respective gas pipe 45a, 45b, 45c, 45d, 45e, 45f.

The heating system 4 further comprises a combustion air supply 43. The combustion air supply 43 is in fluid communication with a combustion air fan 46, via a combustion air pipeline 43a. The combustion air fan 46 comprises an electric drive motor 46a. The combustion air pipeline 43 is fluidly connected to each of the gas burners 40a, 40b, 40c, 40d, 40e, 40f, e.g. via branches 43b, 43c, 43d, 43e, 43f, 43g, respectively. An air control valve 43h, 43i, 43j, 43k, 43l, 43m is provided on the line between each gas burner 40a, 40b, 40c, 40d, 40e, 40f and each respective branch 43b, 43c, 43d, 43e, 43f, 43g. Each branch 43b, 43c, 43d, 43e, 43f, 43g of the combustion air pipeline 43 is connected to the respective gas pipe 45a, 45b, 45c, 45d, 45e, 45f between the temperature control valve 42aa, 42bb, 42cc, 42dd, 42ee, 42ff and the gas burner 40a, 40b, 40c, 40d, 40e, 40f.

Figure 5:
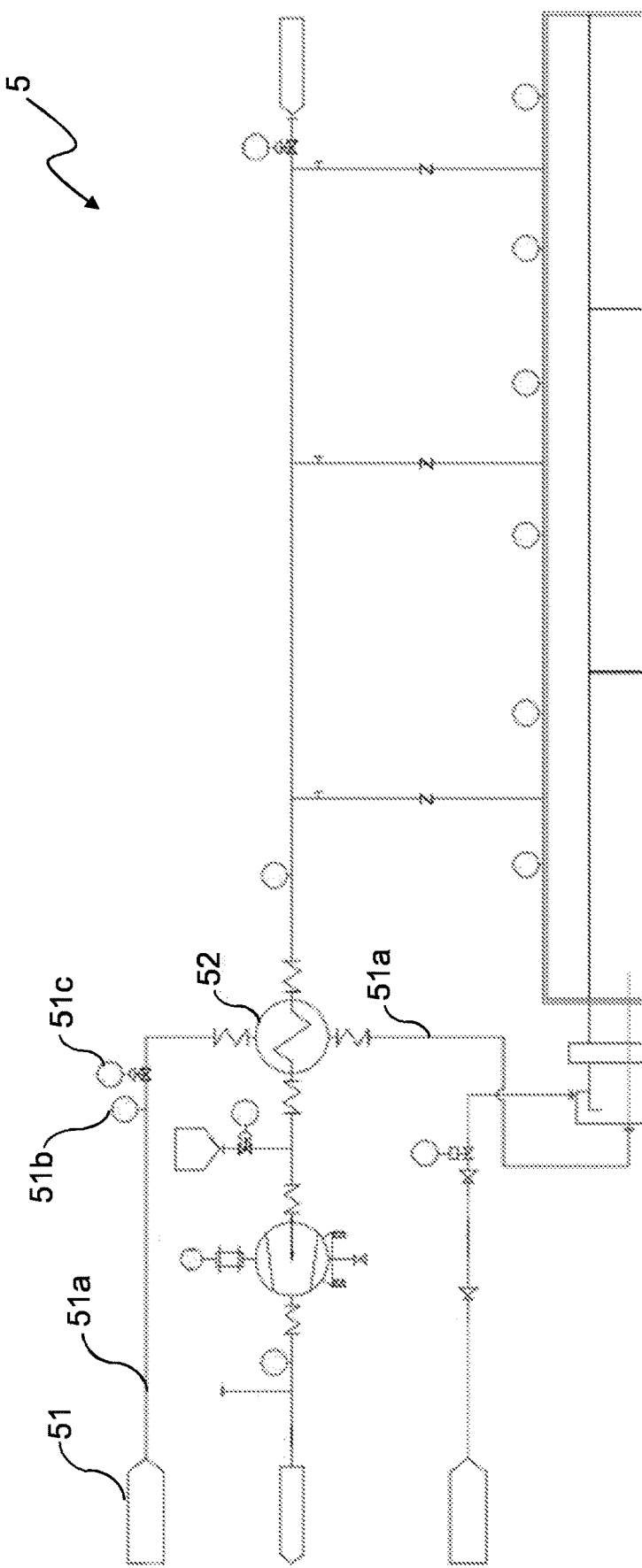
FIG. 5 shows an enlarged view of the steam system shown in FIG. 2.

Referring now to FIG. 5, the steam system 5 is provided with a water source 51. The water source 51 is in fluid communication with a steam superheater 52 via a steam pipeline 51a. A flow sensor 51b is arranged to measure the flow of water from the water source 51 to the steam superheater 52. A flow control valve 51c is located in the steam pipeline 51a. The steam superheater 52 is in fluid communication with the inlet 21 of the rotatable tube 23c via the steam pipeline 51a.

The steam superheater 52 is heated by excess heat from the heating space 23d. The exhaust vents 25a, 25b, 25c are in fluid communication with the superheater 52, to provide the excess heat thereto. The excess heat heats the water to provide superheated steam to the inlet 21 of the rotateable tube 23c.

Figure 6:
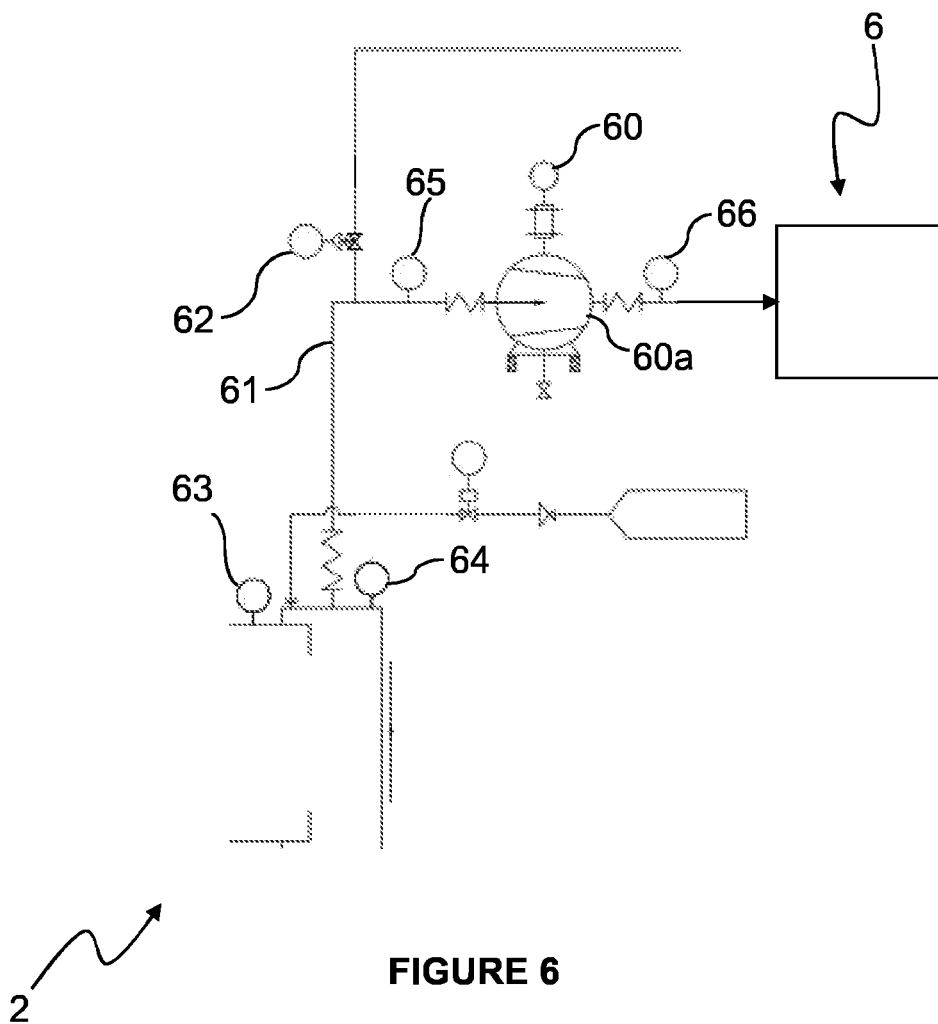
FIG. 6 shows the synthesis gas removal and pressure relief system shown in FIG. 2.

Referring now to FIG. 6, the discharge hood 22a is in fluid communication with a synthesis gas fan 60, e.g. via an outlet pipe 61. The discharge hood 22a is in fluid communication with a pressure control valve 62, e.g. via the outlet pipe 51. The pressure control valve 62 is in fluid communication with the pressure relief system (not shown). The synthesis gas fan 60 is in fluid communication with the cleaning system 6. The synthesis gas fan 60 comprises a variable speed electric drive motor 60a. A pressure sensor 63 is arranged to monitor the pressure inside the rotatable tube 23c at and/or adjacent its outlet 22. A pressure sensor 64 is arranged to monitor the pressure inside the discharge hood 22a. A temperature sensor 65 is arranged to monitor the temperature of a gas flowing, in use, from the discharge hood 22a to the synthesis gas fan 60. A pressure sensor 66 is arranged to monitor the pressure of gas flowing, in use, from the synthesis gas fan 60 to the cleaning system 6.

Referring again to FIG. 2, the apparatus comprises a residue removal system 9 arranged to receive residue from the discharge hood 22a. This residue may be sent on for further processing in a residue processing system (not shown).

The apparatus 1 further comprises a control system (not shown). The monitoring devices 40g, 40h, 40i, 40j, 40k, 40l are in wired connection to the control system. The check valves 21b, 22d are in wired communication with the control system. The pressure transmitter 29m is in wired communication with the control system. The temperature transmitters 29a, 29b, 29c, 29d, 29e, 29f, 29g, 29h, 29i, 29j, 29k, 29l are in wired communication with the control system. The variable speed drive motor 26a is in wired communication with the control system. The gas control valves 44a, 44b, 44c, 44d, 44e, 44f are in wired communication with the control system. The flow sensor 41h is in wired communication with the control system. The pressure sensor 42h is in wired communication with the control system. The temperature control valves 42aa, 42bb, 42cc, 42dd, 42ee, 42ff are in wired communication with the control system. The electric drive motor 46a is in wired communication with the control system. The air control valves 43h, 43i, 43j, 43k, 43l, 43m are in wired communication with the control system. The flow sensor 51b and flow control valve 51c are in wired communication with the control system. The variable speed electric drive motor 60a is in wired communication with the control system. The pressure control valve 62 is in wired communication with the control system. The pressure sensor 64 is in wired communication with the control system. The pressure sensor 63 is in wired communication with the control system. The temperature sensor 65 is in wired communication with the control system. The pressure sensor 66 is in wired communication with the control system. The flow sensor 30 is in wired communication with the control system. In embodiments, one some or each of the above-described components may be in wireless communication with the control system, additionally or alternatively.

Figure 7:
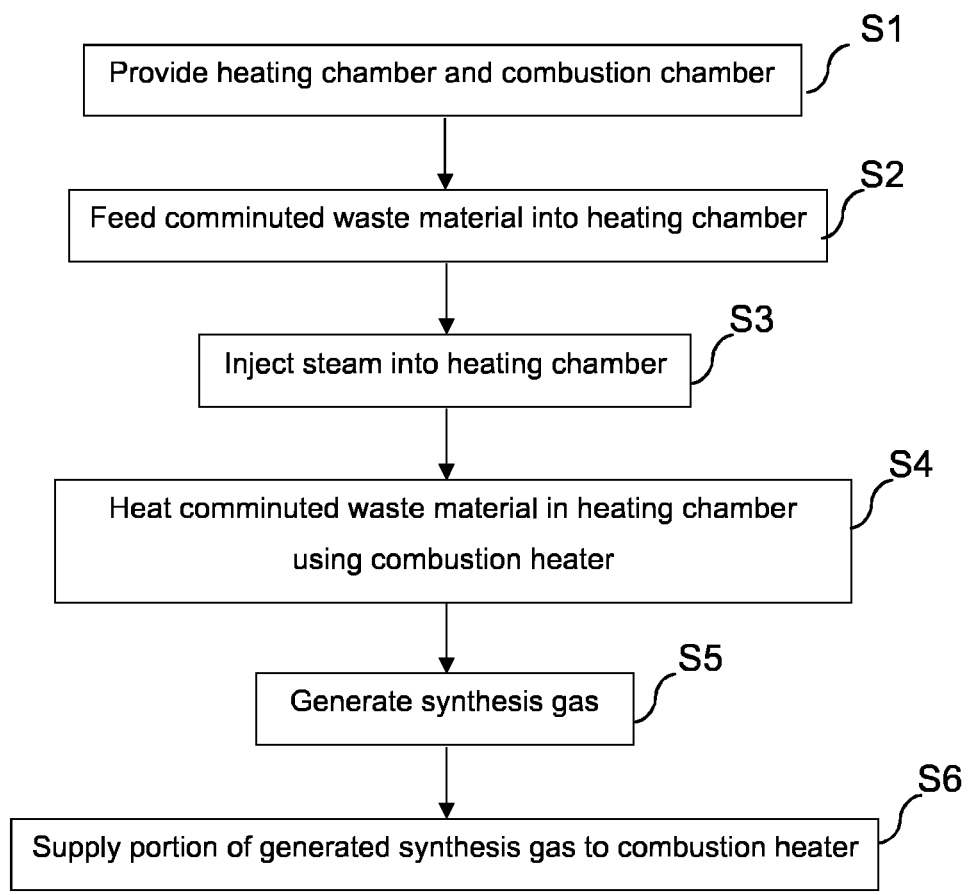
FIG. 7 shows a flow diagram of a method of treating comminuted waste material according to an embodiment of the invention.

Referring now to FIG. 7, there is shown a method of treating comminuted waste material according to an embodiment of the invention, using the apparatus shown in FIGS. 1 to 6.

In a first step S1, the apparatus 1 comprising the heating chamber 28 and the plural gas burners 40a, 40b, 40c, 40d, 40e, 40f is provided. The rotatable tube 23c is caused to rotate.

In a second step S2, comminuted waste material is fed by the feed system 3 into the rotatable tube 23c through the inlet 21 and hence into the heating chamber 28. Without wishing to be bound by any theory it is believed that the angle of incline of the indirect rotary kiln 2 encourages feed material to move along the rotatable tube 23c, e.g. by gravity feed, toward the outlet 22.

In a third step S3, steam is injected by the steam system 5 into the heating chamber 28. Steam is introduced into the rotating tube 23c through the inlet 21 by the steam pipeline 51a. The steam is introduced into the rotating tube 23c at around 600° C.

Hot water is provided to the steam superheater 52 from the hot water source 51. The flow rate of hot water to the steam superheater 52 is monitored by the flow sensor 51*b* and the measurement is sent to the control system. By adjusting the flow control valve 51*c*, the control system can adjust the flow rate of hot water to the steam superheater 52. The hot water is heated to steam in the steam superheater 52 for introduction to the rotatable tube 23*c*.

Advantageously, the steam provides a reducing atmosphere for the generation of synthesis gas. Accordingly, without wishing to be bound by any particular theory, it is believed that the waste material in the heating chamber 28 is more readily and efficiently gasified into synthesis gas in the presence of steam. Furthermore, the steam acts to transfer heat directly to the waste material inside the heating chamber 28. Beneficially, the heat required from the gas burners to reach the required temperatures in the zones 28*a*, 28*b*, 28*c* may therefore be relatively reduced.

In a fourth step S4, the comminuted waste material in the heating chamber 28 is heated using the gas burners 40*a*, 40*b*, 40*c*, 40*d*, 40*e*, 40*f*.

As the waste material moves along the rotatable tube 23*c* it passes through the three zones 28*a*, 28*b*, 28*c*. In an embodiment, the first temperature T1 in the first zone 28*a* is about 700° C.; the second temperature T2 in the second zone 28*b* is about 900° C.; and the third temperature T3 in the third zone 28*c* is about 1100° C. The temperature adjacent the outlet 22 of the heating space 23*d* may be about 1200° C. In embodiments, however the first, second and/or third temperature T1, T2, T3 may be different.

In a fifth step S5, synthesis gas is generated in the heating chamber 28. The synthesis gas comprises a mixture of hydrogen, methane and carbon monoxide, in embodiments, dependent on the comminuted waste material. Additional gaseous substances may also be present, for example carbon dioxide and oxygen, dependent on the comminutued waste material used. The ratio of hydrogen and methane in the generated synthesis gas can be adjusted by adjusting various operating factors of the apparatus 1. For example, it has been found that a relatively greater ratio of hydrogen to methane can be generated by heating to relatively higher temperatures in the second and/or third zones 28*b*, 28*c*. Such relatively higher temperatures may be in the range of 1000 to 1200° C., for example. In this way maximum hydrogen production can be achieved. Conversely, relatively lower temperatures in the second and/or third zones 28*b*, 28*c* may result in a relatively higher ratio of methane to hydrogen in the generated synthesis gas. Such relatively lower temperatures may be in the range of 850 to 950° C., for example. Under such relatively lower temperatures relatively more methane may be present in the synthesis gas which is removed from the rotatable tube 23*c*. This may be advantageous for sending at least a portion of the generated synthesis gas on to the gas burners for heating the heating chamber 28. Additionally or alternatively, at least a portion of the generated synthesis gas may be sent to a generator for generating electrical energy. This electrical energy can be used to power at least part of the apparatus and/or can be sent to the electricity grid and/or to power other machinery.

Heating of the waste material in the heating chamber 28 leads to the generation of synthesis gas (which comprises a combustible gas) in the heating chamber 28, e.g. the fifth step S5.

Generated synthesis gas may have a residence time within the kiln 2 of about 10 seconds. The residence time of the generated synthesis gas can be altered by increasing or reducing the draw generated by the synthesis gas fan 60. Increasing the power to the synthesis gas fan 60 may act to relatively increase the flow of synthesis gas from the rotatable tube 23*c*.

In a sixth step S6, at least a portion of the generated synthesis gas is supplied from the heating chamber 28 to the plural gas burners 40*a*, 40*b*, 40*c*, 40*d*, 40*e*, 40*f*. In some embodiments, the fuel used by the plural gas burners 40*a*, 40*b*, 40*c*, 40*d*, 40*e*, 40*f* may be provided mostly or entirely by generated synthesis gas. In embodiments, the generated synthesis gas (or at least a portion thereof) may be treated prior to being supplied to the plural gas burners 40*a*, 40*b*, 40*c*, 40*d*, 40*e*, 40*f*. For example, one or more components (for example hydrogen) of the generated synthesis gas may be removed prior to supply to the plural gas burners 40*a*, 40*b*, 40*c*, 40*d*, 40*e*, 40*f*.

The time between comminuted waste material entering the rotatable tube 23*c* and the relevant residue being removed by the residue removal system 9 is in the range of 10 to 20 minutes.

Generated synthesis gas exits the rotatable tube 23*c* through the outlet 22. The synthesis gas is drawn from the rotatable tube 23*c* by action of the synthesis gas fan 60. The synthesis gas then enters the discharge hood 22*a*. The synthesis gas is then drawn from the discharge hood 22*a* to the cleaning system 6. Additionally, internal distributors (not shown) aid in transporting solid residues through the heating zone 28 to the discharge hood 22*a*. These solid residues are then removed and processed in the residue removal system 9. Additionally, advantageously, the internal distributors also introduce turbulence to the gases and steam within the heating zone 28. Without wishing to be bound by any theory it is believed that this turbulence enhances the efficiency of synthesis gas generation, for example through enhanced mixing of gasified waste material with steam. The generated synthesis gas is cleaned in the cleaning system 6. The cleaned synthesis gas is then sent to the storage system 7. At least a portion of the synthesis gas is then sent from the storage system 7 to the gas burners 40*a*, 40*b*, 40*c*, 40*d*, 40*e*, 40*f*.

Advantageously, the method and apparatus 1 described above provides a relatively more efficient system than prior art systems. For example, by utilizing synthesis gas generated by the apparatus 1 as a fuel source for the plural gas burners 40*a*, 40*b*, 40*c*, 40*d*, 40*e*, 40*f* the amount of external fuel is relatively reduced. The cost of heating the heating chamber 28 may, accordingly, be relatively reduced with respect to prior art apparatus and methods.

As will be appreciated by one skilled in the art, the various steps described above may occur simultaneously. For example, waste material may be fed into the indirect kiln 2 at the same time as previously fed waste material is being heated by the gas burners.

The pressure in the rotatable tube 23*c* is monitored by the pressure sensor 63. The temperature in the outlet pipe 51 is monitored by the temperature sensor 65. The control system receives the monitored pressure and temperature. If the monitored pressure is greater than a predefined threshold then the control system is configured to actuate the pressure control valve 62 to allow synthesis gas to escape from the rotatable tube 23*c*. A pressure increase could be caused by, for example, an incident such as a blockage in the rotatable tube 23*c*. If the monitored pressure is less than a predefined threshold then the control system increases the draw of the fan 60. The pressure in the rotatable tube 23*c* may be set to about 1 bar, e.g. atmospheric pressure.

The residue removal system 9 removes solids residue from the discharge hood 22*a* to be processed appropriately.

The control system may periodically provide a nitrogen purge to the inlet of the rotatable tube 23c from the first nitrogen supply 21a, by opening the check valve 21b. The control system may also provide a nitrogen purge to the discharge hood 22a from the second nitrogen supply 22c by opening the check valve 22d.

Figure 8:
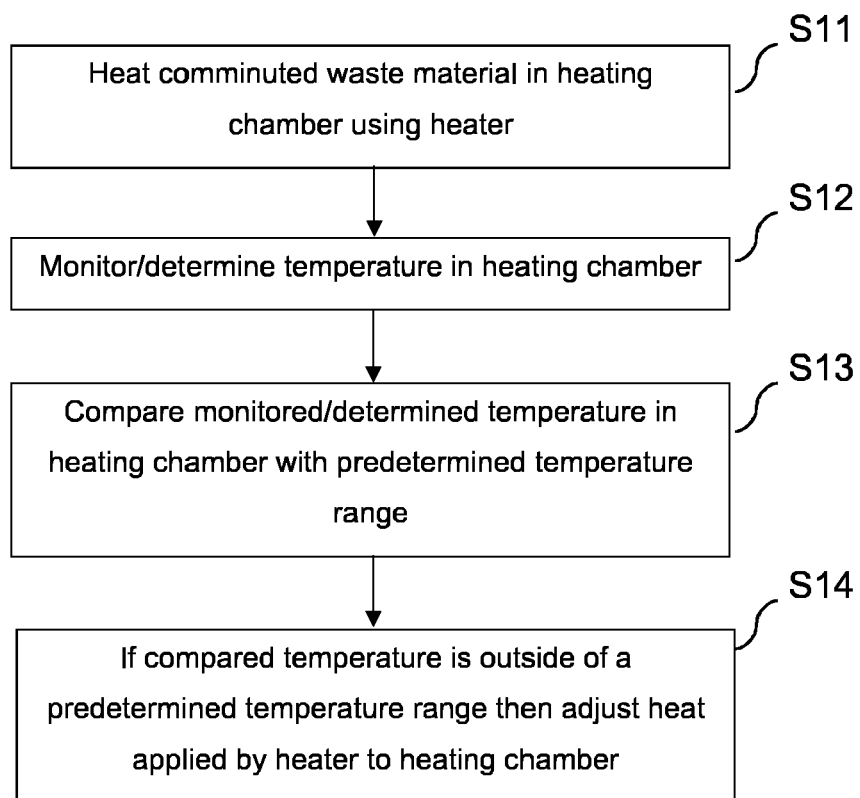
FIG. 8 shows a flow diagram of a method of treating comminuted waste material according to a further embodiment of the invention.

Referring now to FIG. 8, there is shown a method of treating comminuted waste material according to a further embodiment of the invention.

In a first step S11, comminuted waste material in the heating chamber 28 is heated using the gas burners 40a, 40b, 40c, 40d, 40e, 40f.

In a second step S12, the temperature in the heating chamber 28 is measured by the temperature sensors 29a, 29b, 29c, 29d, 29e, 29f, 29g, 29h, 29i, 29j, 29k, 29l. The measured temperature is sent to the control system. The temperature inside of the heating space 23d is measured by the temperature sensors 29g, 29h, 29i, 29j, 29k, 29l. This measured temperature is sent to the control system. As will be appreciated. the temperature in each of the zones 28a, 28b, 28c of the heating chamber 28 can be measured or determined individually. Additionally or alternatively, the temperature in the heating space adjacent each of the zones 28a, 28b, 28c can also be measured or determined individually.

Additionally, the monitoring devices 40g, 40h, 40i, 40j, 40k, 40l record the presence or absence of a flame at each gas burner 40a, 40b, 40c, 40d, 40e, 40f, respectively. The pressure sensor 42h measures the pressure of synthesis gas in supply pipeline 42a. The flow sensor 41h measures the flow rate of natural gas through the natural gas pipeline 41.

In a third step S13, the control system compares the monitored or determined temperature in the heating chamber 28 with a predetermined temperature range. In particular, the monitored or determined temperature in the first zone 28a of the heating chamber 28 is compared with a predetermined temperature range for the first zone 28a. The monitored or determined temperature in the second zone 28b of the heating chamber 28 is compared with a predetermined temperature range for the second zone 28b. The monitored or determined temperature in the third zone 28c of the heating chamber 28 is compared with a predetermined temperature range for the third zone 28c.

Additionally, the control system uses data received from the monitoring devices 40g, 40h, 40i, 40j, 40k, 40l, the pressure sensor 42h and the flow sensor 41h to monitor the operation of the heating system 4.

In a fourth step S14, the control system adjusts the amount of heat applied by one or more of the gas burners 40a, 40b, 40c, 40d, 40e, 40f to the heating chamber 28 if the measured or determined temperature in the heating chamber is outside of the predetermined temperature range. If, for example the measured or determined temperature in the first zone 28a of the heating chamber 28 is lower than the predetermined temperature range, then the control system adjusts one or each of gas burners 40a and 40b to increase the amount of heat they are applying to the first zone 28a.

The predetermined temperature range in the first zone 28a may be between 650 and 750° C., say between 660, 670, 680 or 690 and 710, 720, 730 or 740° C. The predetermined temperature range in the second zone 28b may be between 850 and 950° C., say between 860, 870, 880 or 890 and 910, 920, 930 or 940° C. The predetermined temperature range in the third zone 28c may be between about 1050 and 1150° C., say between about 1060, 1070, 1080 or 1090 and 1110, 1120, 1130 or 1140° C. The predetermined temperature range may be altered or set dependent on the composition of the waste material (for example the waste material to be fed into the heating chamber 28).

The temperature in each of the zones 28a, 28b, 28c of the heating chamber 28 is controlled by controlling the heat applied by each of the gas burners 40a, 40b, 40c, 40d, 40e, 40f. The heat applied by each of the gas burners 40a, 40b, 40c, 40d, 40e, 40f is independently controlled by the control system. For example, the control system can increase or reduce the mass flow rate of air supplied to one, some or each of the gas burners 40a, 40b, 40c, 40d, 40e, 40f. The control system can also increase or reduce the mass flow rate of fuel to one, some or each of the gas burners 40a, 40b, 40c, 40d, 40e, 40f. The fuel may comprise a mixture of natural gas and synthesis gas. Additionally or alternatively, the control system can alter the ratio of the mixture of natural gas to synthesis gas in the fuel. Each gas control valve 44a, 44b, 44c, 44d, 44e, 44f can alter the amount of natural gas supplied to the respective gas burner 40a, 40b, 40c, 40d, 40e, 40f, or prevent any natural gas from being supplied to the respective gas burner 40a, 40b, 40c, 40d, 40e, 40f. Each gas control valve 44a, 44b, 44c, 44d, 44e, 44f can alter the amount of synethisis gas supplied to the respective gas burner 40a, 40b, 40c, 40d, 40e, 40f, or prevent any synthesis gas from being supplied to the respective gas burner 40a, 40b, 40c, 40d, 40e, 40f. In embodiments, only synthesis gas may be supplied to one, some or each of the gas burners 40a, 40b, 40c, 40d, 40e, 40f. In embodiments, only natural gas may be supplied to one, some or each of the gas burners 40a, 40b, 40c, 40d, 40e, 40f. Only natural gas may be supplied to the gas burners 40a, 40b, 40c, 40d, 40e, 40f when, for example, there is insufficient synthesis gas available. Such a situation may occur during initial start-up and running of the apparatus 1.

The temperatures in the three temperature zones 28a-c may additionally be controlled by the control system altering the rotational velocity of the rotatable tube 23c. The control system is configured to control the variable speed drive motor 26 to rotate the rotating tube 23c at the desired rotational velocity.

The combustion air fan 46 is operable (e.g. by the control system) at a constant speed or at variable speeds. The electric drive motor 46a can be controlled by the control system. Because the flow rate of combustion air to the gas burners 40a, 40b, 40c, 40d, 40e, 40f is determined by the combustion air control valves 43h, 43i, 43j, 43k, 431, 43m, variable control of the electric drive motor 46a on the combustion air fan 46 is only provided to improve the operating efficiency of the heating system 4.

Figure 9:
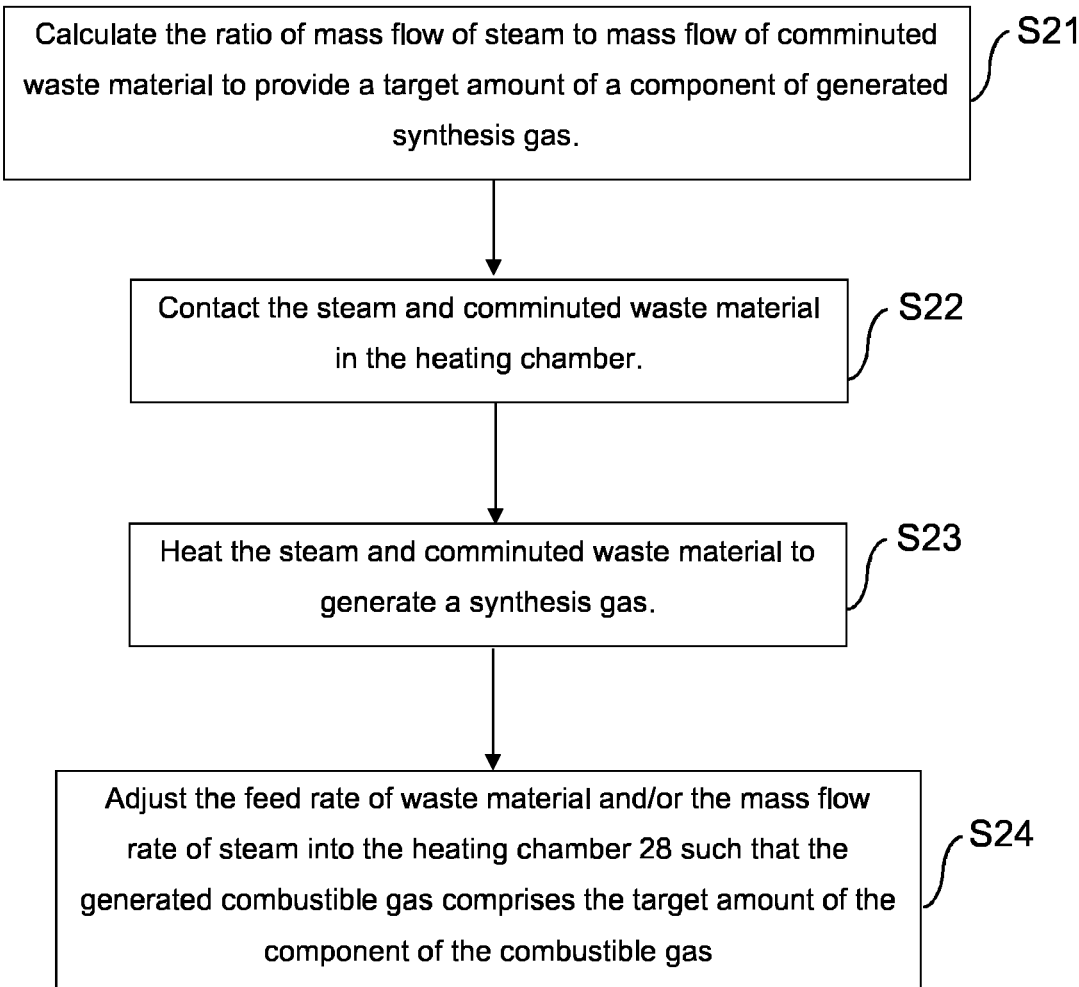
FIG. 9 shows a flow diagram of a method of treating comminuted waste material according to a further embodiment of the invention.

Referring now to FIG. 9, there is shown a method of treating comminuted waste material according to a further embodiment of the invention.

In a first, optional step S21, a ratio of mass flow of steam to mass flow of comminuted waste material is calculated. In embodiments this may be calculated by or using the control system. The ratio is calculated to provide a target amount of a component of synthesis gas generated in the heating chamber 28. In embodiments, the ratio is calculated to provide a target amount of methane or hydrogen. The ratio may be calculated based upon historical operating data. The ratio may be based upon theoretical analysis, or the output of a proprietary process modelling software. The ratio may be calculated based upon a combination of historical operating data and theoretical analysis. The ratio is calculated based upon the specific geometry and operating conditions of the indirect rotary kiln 2 and of the type and granularity of the comminuted waste material.

In a second step S22, comminuted waste material is fed into the heating chamber 28 in a manner similar to that described with respect to step S2 of the method described in respect of FIG. 7. In a third step S23, steam is introduced to the heating camber 28.

In a second step S24, the steam is contacted with the comminuted waste material, which comprises mixing, in this embodiment. Comminuted waste material is fed into the heating chamber 28 in a manner similar to that described with respect to step S2 of the method described in respect of FIG. 7. Steam is introduced to the heating camber 28. In this embodiment, mixing of steam and comminuted waste material occurs inside of the heating chamber 28. However, in embodiments, mixing (and, indeed contacting) may occur at least partially external to the heating chamber 28.

In a third step S25, the steam and comminuted waste material are heated inside the heating chamber 28 to generate a synthesis gas. This generated synthesis gas then exits the heating chamber 28 and enters the cleaning system 6 for further processing, as described above.

In a fourth step S26, the ratio of mass flow of steam to mass flow of comminuted waste material is adjusted such that the generated synthesis gas comprises the target amount of the component (e.g. methane or hydrogen) thereof, at a given temperature or temperatures in the zones 28a, 28b, 28c of the heating chamber 28.

The mass flow rate of comminuted waste material fed into the heating chamber 28 is measured or determined. In embodiments, this is accomplished by monitoring the mass of comminuted waste which is fed into the heating chamber 28 by the feed screw. This may be accomplished by measuring or determining the angular velocity of the feed screw. In embodiments, the angular velocity of the feed screw can be measured directly (for example via measurement or knowledge of the angular velocity of the motor driving the feed screw rotation) and/or can be measured indirectly (for example using an encoder).

The mass flow rate of steam into the heating chamber 28 is measured or determined by monitoring the flow of water via the flow sensor 51b, in this embodiment. In embodiments, however, any suitable means for monitoring the mass flow rate of steam into the heating chamber 28 may be used.

The feed rate of comminuted waste material into the heating chamber 28 can then be controlled by adjusting the angular velocity of the feed screw. Additionally or alternatively, the mass flow rate of steam into the heating chamber 28 can be controlled by adjusting (e.g. automatically or manually) the flow control valve 51c. In this way, the mass flow rate of comminuted waste material into the heating chamber 28 can be adjusted to reach the calculated ratio of mass flow of steam to mass flow of comminuted waste material. In this way, the target amount of the component (e.g. hydrogen or methane) of the generated synthesis gas is achieved.

As will be appreciated by one skilled in the art, the first, optional step S21 can be carried out at any time prior to or simultaneously (e.g. at least partially) any of the other steps of the method. The steps S22, S23, S24 and S25 may, in embodiments, be continuous (or substantially continuous) during the treatment of the comminuted waste material. The first, optional step S21 may be run a single time or multiple times during the treatment of the comminuted waste material. For example, a different target amount of the component of the generated synthesis gas may be set. Additionally or alternatively, a different component of the generated synthesis gas may be set. Additionally or alternatively, one or more operating characteristics of the heating chamber (e.g. one or more temperatures therewithin and/or a rate of rotation thereof) may be altered and/or the composition and/or type of the comminuted waste material (e.g. a different plastics or mixture of plastics materials and/or a different size or range of sizes of comminuted particles of the waste material) may be used. A new calculation, where performed, may be based on any one or more of the above-identified characteristics and/or target component amounts. In embodiments, the optional step S21 may be carried out once one or more of the other steps has already begun. In embodiments, the sixth step S26 may be carried out subsequent to the optional step S21, for example and may be based on the results from the optional step S21.

EXAMPLE

Theoretical analysis using a proprietary process modelling software was undertaken to provide calculations of the ratio of mass flow of steam to mass flow of comminuted waste necessary to provide a target amount of a component of generated synthesis gas (e.g. the optional first step S21).

In one example, the comminuted waste material was polypropylene, the operating temperature within the heating chamber 28 was set to be 1150° C. The target component was set to be methane and its target amount was set to be 35% v/v of the generated synthesis gas.

Using the theoretical analysis it was determined that the ratio of mass flow of steam to mass flow of comminuted waste material was 0.6.

It has been surprisingly found that by increasing the ratio of steam to comminuted waste material between a ratio of 0 and 0.6 results in a decrease in the amount of hydrogen (on a percentage v/v of the generated synthesis gas) generated. Increasing the ratio of steam to comminuted waste material between a ratio of 0.6 and 1, however, results in an increase in the amount of hydrogen (on a percentage v/v of the generated synthesis gas) generated.

Figure 10:
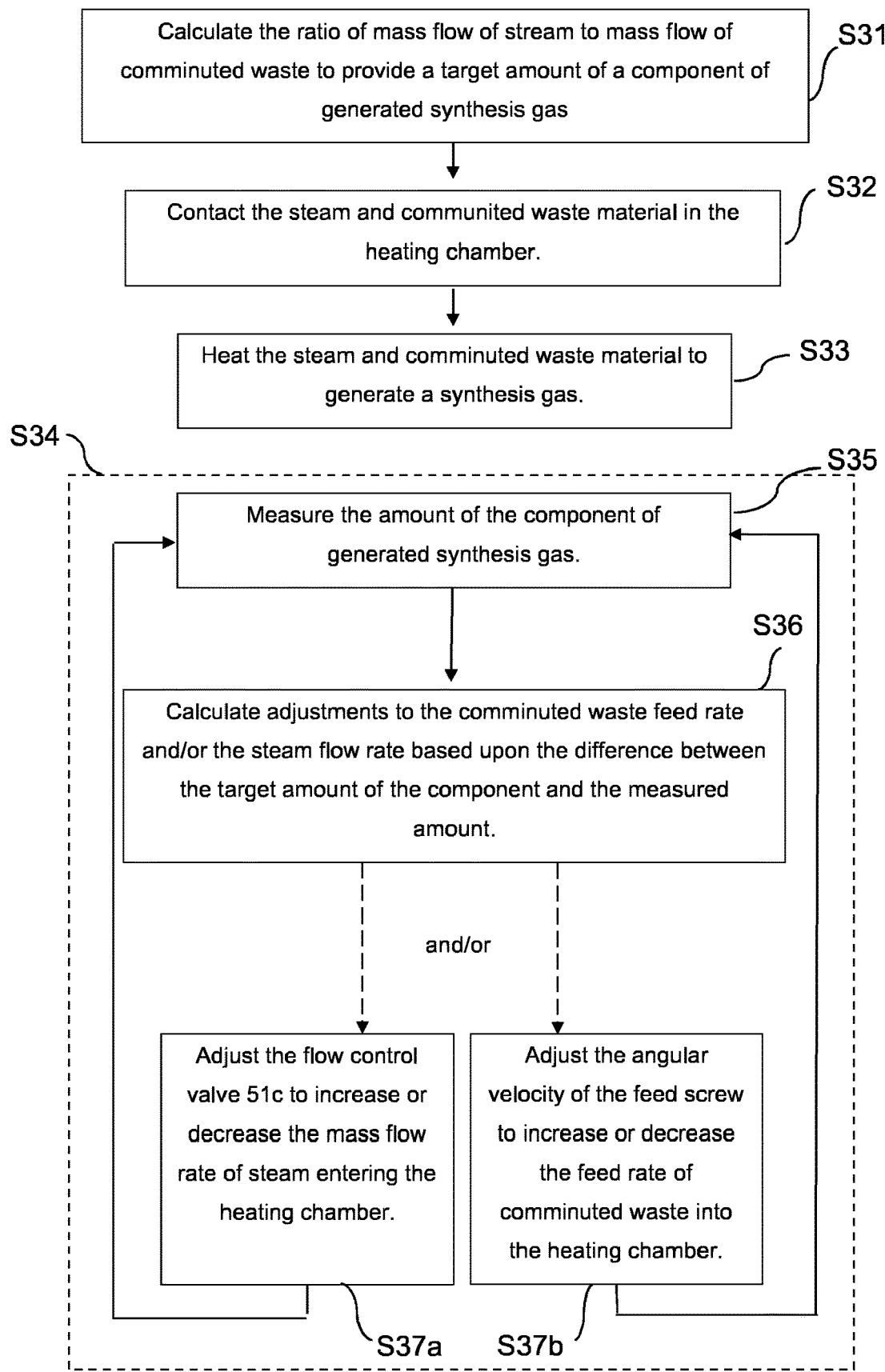
FIG. 10 shows a flow diagram of a method of treating comminuted waste material according to a further embodiment of the invention.

Referring now to FIG. 10, there is shown a method of treating comminuted waste material according to a further embodiment of the invention.

The first three steps S31, S32, S33 of the method shown in FIG. 10 are similar to the first three steps S21, S22, S23, respectively, of the method shown in FIG. 9.

The method shown in FIG. 10 includes a fourth step S34 comprising a feed-back loop (e.g. a closed loop) for controlling the amount of a component contained in generated synthesis gas.

The fourth step S34 comprises a first stage S35 of measuring the amount of the component in generated synthesis gas. This measurement may occur outside or inside the kiln 2, and/or may be achieved through use of a gas analyser, gas analysis means or system (not shown). The gas analyser or gas analysis means or system may comprise a gas chromatograph and/or may use gas chromatography and/or any other suitable technique as known to one skilled in the art. In embodiments, one or more other component of the generated synthesis gas may be measured (e.g. additionally).

In a second stage S36 the controller determines or calculates the difference between the target amount of the component of the generated synthesis gas and the measured amount of the component. If there is a difference then the controller calculates an alteration to the angular velocity of the feed screw and/or an alteration to the flow control valve 51c to, respectively, adjust the feed rate of comminuted waste material and the mass flow rate of steam into the heating chamber 28 in order to produce the target amount of the component. This calculation may be at least partially automated or may be performed by an operator.

In a third stage S37a, S37b an adjustment is made to the flow control valve 51c to increase or decrease the mass flow rate of steam entering the heating chamber and/or an adjustment is made to the angular velocity of the feed screw to increase or decrease the feed rate of comminuted waste material into the heating chamber. The adjustment(s) is/are made responsive to the calculation performed in the second stage S36. In one embodiment, only the mass flow rate of steam is adjusted. In another embodiment, only the feed rate of comminuted waste material is adjusted.

The above-described feed-back loop of the fourth step S34 provides for monitoring and control of the generated synthesis gas such that the target amount of the component is generated. Advantageously, this allows for maintaining a target amount of a component of the generated synthesis gas during operation. Further advantageously, this allows the target amount and/or the component to be changed during operation of the method. In this way, changes to end-use requirements can be more rapidly and readily met.

It will be appreciated by those skilled in the art that several variations to the aforementioned embodiments are envisaged without departing from the scope of the invention. For example, one or more steps or stages of one method may be used, additionally or alternatively, in any of the other methods. Furthermore, the control system may be automated (e.g. at least partially) or manually monitored and/or controlled (e.g. at least partially). The control system may be located remotely or at or adjacent the apparatus 1. Additionally or alternatively, although a natural gas source 41 is described, this could instead be another combustible fuel, such as oil or coal or the like. Additionally or alternatively, although six gas burners are shown there may instead be any suitable number, for example more or less than six. Additionally or alternatively, although a single indirect rotary kiln is shown there may instead be plural indirect rotary kilns. Where more than one indirect rotary kiln is provided there may be a heating system, steam system, supply system, etc. for each indirect rotary kiln. Alternatively, where more than one indirect rotary kiln is provided a heating system, steam system, supply system or the like may be shared between two or more indirect rotary kilns.

Additionally or alternatively, any of the above-described methods may comprise a step of cleaning generated synthesis gas and/or any component thereof. Additionally or alternatively, any of the above-described methods may comprise a step of preparing or delivering generated (and/or cleaned) synthesis gas and/or any component thereof to or for a gas grid. Additionally or alternatively, any of the above-described methods may comprise a step of further processing generated synthesis gas and/or any component thereof, for example to produce a particular component or compound (e.g. methanol or carbon monoxide or the like).

Additionally or alternatively, although the apparatus 1 is described as comprising an indirect rotatable kiln 2 this need not be the case and, instead, the kiln may be a direct kiln, e.g. a direct rotatable kiln.

Additionally or alternatively, whilst the comminuted waste material and the steam are described as being mixed, said mixing may be due to introduction of the comminuted waste material into contact with the steam, only. Alternatively, mixing may comprise use of a mixing means or mixer configured to aid or enhance mixing of the comminuted waste material and steam. Where provided, the mixing means or mixer may be provided inside the kiln 2, for example inside the heating chamber 28. Alternatively, the mixing means or mixer may be provided at least partially outside of the kiln 2 (e.g. at least partially outside of the heating chamber 28).

It will also be appreciated by those skilled in the art that any number of combinations of the aforementioned features and/or those shown in the appended drawings provide clear advantages over the prior art and are therefore within the scope of the invention described herein.

The invention claimed is:

1. A method of treating comminuted waste material, the method comprising:
   a) providing an apparatus for treating comminuted waste material, the apparatus comprising a heating chamber and plural combustion heaters for heating the contents of the heating chamber, the heating chamber having an inlet and an outlet and comprising a first, a second zone, and a third zone, and wherein the apparatus comprises a wall surrounding an outer surface of the heating chamber and heating space defined between the wall and the outer surface of the heating chamber, wherein said plural combustion heaters are located, in use, outside the heating chamber and are configured to heat the heating space to thereby heat the comminuted waste material within the heating chamber,
   b) feeding comminuted waste material through the inlet and into the heating chamber;
   c) heating the comminuted waste material in the first, second and third zones of the heating chamber, using said plural combustion heaters, to generate a combustible gas;
   d) supplying at least a portion of the generated combustible gas to said plural combustion heaters for heating the first, second and third zones of the heating chamber; and
   e) heating the comminuted waste material in the first zone of the heating chamber to a first temperature T1 to gasify the comminuted waste material; heating the gasified material in the second zone of the heating chamber to a second temperature T2 to generate combustible gas, where the second temperature T2 is greater than the first temperature T1, and heating the combustible gas in the third zone of the heating chamber to a third temperature T3 which is greater than the first temperature T1, and
   adjusting the amount of heat applied by the said one or more combustion heaters to the first, second, and third zones of the heating chamber by altering the ratio of two or more fuel components supplied to said plural combustion heaters.

2. A method of treating comminuted waste material according to claim 1, comprising measuring or determining the temperature inside the heating chamber.

3. A method of treating comminuted waste material according to claim 2, comprising adjusting the heat generated by one or more of said plural combustion heaters in response to a measured or determined temperature inside the heating chamber.

4. A method of treating comminuted waste material according to claim 1, comprising a step c1) of cleaning the generated combustible gas, wherein step c1) occurs prior to step d) and subsequent to step c).

5. A method of treating comminuted waste material according to claim 4 wherein the heating chamber is rotatable, in use, and where the method comprises a step c2) of rotating the heating chamber.

6. A method of treating comminuted waste material according to claim 5, comprising a step c3) of introducing steam into the heating chamber.

7. An apparatus for treating comminuted waste material, the apparatus comprising: a heating chamber for generating a combustible gas from comminuted waste material, the heating chamber comprising an inlet for the introduction of comminuted waste material into the heating chamber, an outlet for the egress of a generated combustible gas from the heating chamber, and comprising a first, second and third zones; plural combustion heaters configured or configurable to heat, in use, the contents of the heating chamber; a controller configured or configurable to adjust or alter the amount of heat generated by said plural combustion heaters to the first, second, and third zones of the heating chamber, wherein the controller is configured to alter the ratio of two or more fuel components of a fuel mixture arranged or arrangeable to supply fuel to said plural combustion heaters, such that the controller is configured to adjust or alter the heat generated by said plural combustion heaters by adjusting the amount of combustible gas in the fuel mixture, and wherein the first zone is heated to a first temperature $T1$ and the second zone is heated to a second temperature $T2$ and wherein the second temperature $T2$ is higher than the first temperature $T1$, and wherein the third zone is heated to a third temperature $T3$ which is greater than the first temperature $T1$; and a supply system configured or configurable to supply to said plural combustion heaters at least a portion of a combustible gas generated, in use, in the first, second and third zones of the heating chamber, wherein the apparatus comprises a wall surrounding an outer surface of the heating chamber and a heating space defined between the wall and the outer surface of the heating chamber, wherein said plural combustion heaters are located, in use, outside of the heating chamber and are configured to heat the heating space to thereby heat the comminuted waste material within the heating chamber.

8. Apparatus according to claim 7, comprising a generator for generating electrical energy.

9. Apparatus according to claim 8, wherein the supply system is configured or configurable to supply to the generator at least a portion of a combustible gas generated, in use, in the first and second zone of the heating chamber.

10. Apparatus according to claim 7, wherein a first of the said plural combustion heater is configured or configurable to heat comminuted waste material in the first zone of the heating chamber to the first temperature $T1$ and a second of the said plural combustion heater is configured or configurable to heat gasified material in the second zone of the heating chamber to the second temperature $T2$.

11. Apparatus according to claim 7, comprising one or more temperature sensors configured or configurable to measure or determine the temperature inside the heating chamber.

12. Apparatus according to claim 11, wherein the controller is configured to adjust or alter the heat generated by one or more of the said plural combustion heaters in response to temperature measured or determined inside the heating chamber by the one or more temperature sensors.

13. Apparatus according to claim 7, comprising a cleaning system for cleaning combustible gas generated in the heating chamber.

14. Apparatus according to claim 7, wherein the heating chamber is arranged or configured to be rotatable, in use.

15. Apparatus according to claim 7, comprising steam delivery system configured or configurable to introduce steam into the heating chamber.

16. An apparatus for treating comminuted waste material, the apparatus comprising: a heating chamber for generating a combustible gas from comminuted waste material, the heating chamber comprising an inlet for the introduction of comminuted waste material into the heating chamber, an outlet for the egress of a generated combustible gas from the heating chamber, and comprising a first and second zone; plural combustion heaters configured or configurable to heat, in use, the contents of the heating chamber; a controller configured to adjust or alter the amount of heat generated by said plural combustion heaters to the first and second zone of the heating chamber, wherein the controller is configured to alter the ratio of two or more fuel components of a fuel mixture arranged or arrangeable to supply fuel to the said combustion heaters, and wherein the first zone is heated to a first temperature $T1$ and the second zone is heated to a second temperature $T2$ and wherein the second temperature $T2$ is higher than the first temperature $T1$; and a supply system configured or configurable to supply to the said plural combustion heaters at least a portion of a combustible gas generated, in use, in the first and second zone of the heating chamber, wherein the said plural combustion heaters is configured or configurable to heat a third zone in the heating chamber to a third temperature $T3$, where the third temperature $T3$ is greater than the first temperature $T1$.

17. Apparatus according to claim 16, wherein a third of said plural combustion heater is configured or configurable to heat the third zone of the heating chamber to a third temperature $T3$.

* * * * *